(12) United States Patent
Petrouske

(10) Patent No.: US 11,039,263 B2
(45) Date of Patent: Jun. 15, 2021

(54) WIDE EFFECT SOUND PRODUCING METHOD

(71) Applicant: Mark Petrouske, Carolina, PR (US)

(72) Inventor: Mark Petrouske, Carolina, PR (US)

( * ) Notice: Subject to any disclaimer, the term of this patent is extended or adjusted under 35 U.S.C. 154(b) by 0 days.

(21) Appl. No.: 16/424,687

(22) Filed: May 29, 2019

(65) Prior Publication Data

US 2020/0382890 A1    Dec. 3, 2020

(51) Int. Cl.
*H04S 7/00* (2006.01)
*G11B 27/00* (2006.01)
*H04S 1/00* (2006.01)

(52) U.S. Cl.
CPC .............. *H04S 7/30* (2013.01); *G11B 27/005* (2013.01); *H04S 1/007* (2013.01)

(58) Field of Classification Search
CPC ...... H04R 5/00; H04R 2420/01; H04R 25/43; H04S 7/30; H04S 1/002; H04S 1/007; G11B 27/005; G10H 1/0033; G10H 2240/161
USPC ........ 381/1, 61, 119; 84/601, 602, 604, 609; 700/94; 369/4
See application file for complete search history.

(56) References Cited

U.S. PATENT DOCUMENTS

| | | | | |
|---|---|---|---|---|
| 3,821,471 | A | * 6/1974 | Bauer | H04S 3/02 381/22 |
| 5,703,956 | A | * 12/1997 | Kim | H04S 1/002 381/61 |
| 9,786,259 | B2 | * 10/2017 | Siciliano | H04H 60/04 |

* cited by examiner

*Primary Examiner* — Xu Mei
(74) *Attorney, Agent, or Firm* — DBPR Legal LLC; Walter O. Alomar-Jiménez, Esq.

(57) ABSTRACT

An apparatus comprising a recording medium including a wide sound composition and a method for producing said wide sound composition. The wide sound composition comprises a full composition or a partial composition recorded in combination with a delayed full composition or a partial composition. The method for producing said wide sound composition comprises at least an audio reproducing mechanism, an audio recording device and a recording medium for the storage of a wide sound composition, wherein said audio reproducing mechanism comprises at least a first and second electroacoustic device and a source music and, wherein said source music comprises at least a full composition or a partial composition.

11 Claims, 7 Drawing Sheets

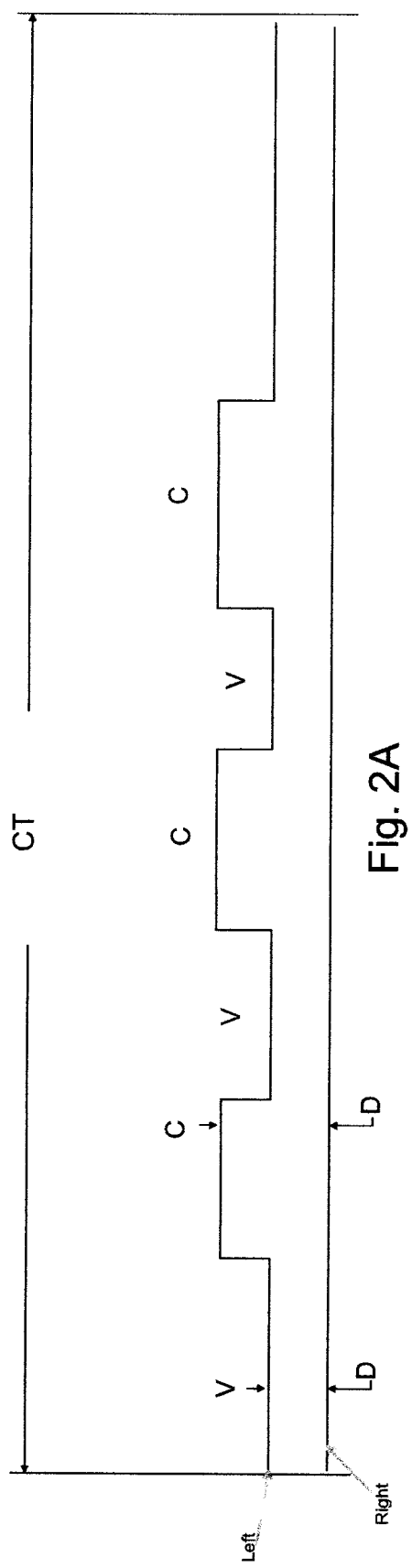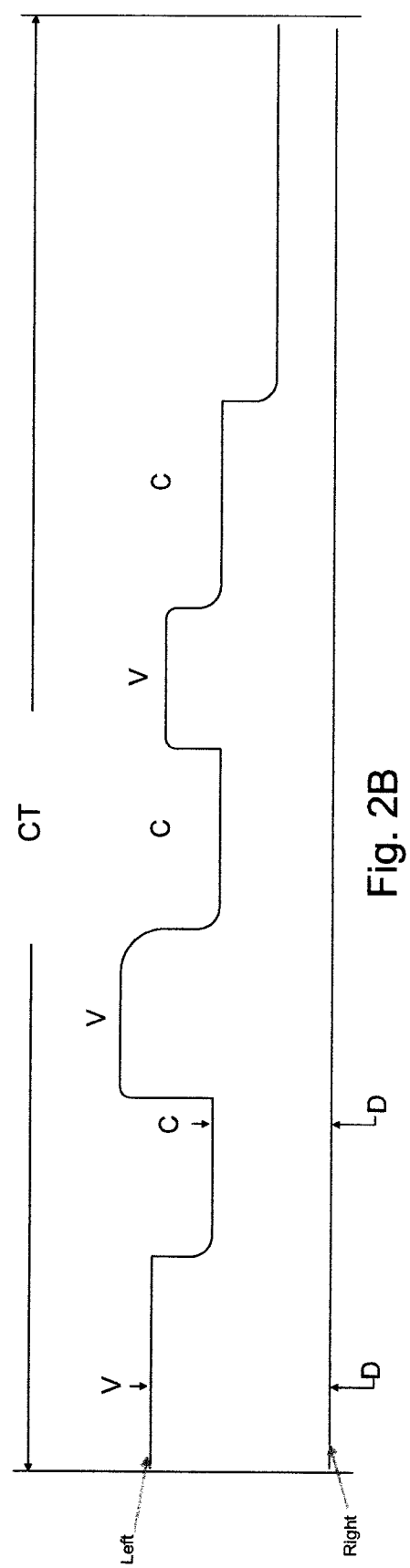

WIDE EFFECT SOUND PRODUCING METHOD

STATEMENT REGARDING FEDERALLY SPONSORED RESEARCH AND DEVELOPMENT

N/A

RELATED APPLICATIONS

N/A

BACKGROUND OF THE DISCLOSURE

Technical Field

The present disclosure relates to a method for producing a sound particularly adapted to create a wide effect sound and apparatus comprising said wide effect recorded media.

Discussion of the Background

A sound reproducing system usually comprises a right and left speaker which transmit right and left stereo sounds, respectively. Some method and apparatus are directed to give the listener a greater dimensionalized impression/effect of the overall sound patterns. In a stereophonic sound reproduction system comprising two speakers a dimensionalized effect can be obtained by transmitting different sound signals per speaker. Basically by positioning the speakers at laterally spaced locations the listener, which is positioned rearwardly of the speakers and facing toward a location between a speaker, will listen a distinct sound that is transmitted from the left speaker and right speaker since the left and right ears of the listener will detect a phase shift so as to obtain the impression of the direction of the sound. For example, a dimensional sound producing system could be defined by a right main signal directed to a right speaker wherein said right main signal comprises a 180 degree phase delay of the highest decibel frequency of the right main signal. Further the right main signal is then transmitted and attenuated to the left signal which is then added in conjunction to the left main signal and delivered to the left speaker. Also, inversely, the left main signal directed to left speaker with 180 degree phase delay of the highest decibel frequency of the left main signal then transmitted and attenuated to the right signal which is then added in conjunction to the right main signal and delivered to the right speaker. On this type of system, the delayed signals are static and are defined in 4 discrete ranges of 110 uS, 180 uS, 370 uS, 690 uS. Unfortunately the system process does not combine or fail to provide a full composition signals from the left and right speakers wherein he signals are isolated and separate from left speaker to right speaker.

Other system, such as systems involves in car stereos, defines delay replication from right main signal directed to right speaker then subsequently reproduced and sent to the left speaker with a (0 to 50 Millisecond) phase delay. The delayed signals are adjustable via tuner pots and defined in the range of 0 to 50 milliseconds wherein the delay and amplification levels are set manually the effect is the same for all compositions played. The car stereo systems fail a much larger delay range from 51 milliseconds to 3000 milliseconds and does not does not combine signal from left to right. Other car stereo systems found the null location in a stereo with respect to sound cancellation of 180-degree frequency signals. This is helpful for "tuning" car stereo delay systems and surround sound systems. However, the process is not directed to produce delays higher than 50 milliseconds nor to produce an echo effect for listening to the composition but rather a way to tune an existing system.

Further, the costs of system that reproduce delay replication from right main signal directed to right speaker are high and limit the experience to a sector or consumers. Therefore, the present disclosure is directed to overcoming the one or more problems or disadvantages associated with the prior art.

SUMMARY OF THE DISCLOSURE

In accordance with the principles of the current disclosure, the present exemplary embodiment is directed toward a method for producing a sound particularly adapted to create a wide effect sound and recording said wide effect sound on a reproducing medium for further reproduction. In the first exemplary embodiment the method for creating a wide effect sound comprises at least an audio reproducing mechanism, an audio recording device and a recording medium for the storage of a wide sound composition, wherein said audio reproducing mechanism comprises at least a electroacoustic device and a source music. A source music comprises a full composition or a partial composition wherein the selection of the source music depends on the producer preference. As mentioned before, the audio reproducing mechanism comprises at least an electroacoustic device, wherein said audio reproducing mechanism is intended to play the source music, either full composition or partial composition, and distribute it to a left signal in a stereo system as the "lead music". Further the audio reproducing mechanism played the source music in a full composition or partial composition to the remaining opposite right signal as the "Lag music". It is important to understand that the left signal could come out as a right signal and vice versa, however at least one of the signals, left or right, must be the lead music and the other the lag music.

The lead music and the lag music are further presented to the audio recording device input in order to be recorded as the wide sound effect composition on a recording medium, wherein said recorded wide sound effect composition comprises the time differential (Delay) between the signals. The recorded wide sound effect composition is a modified source music comprising a lead music and lag music.

The delay time between lead and lag is variable depending on the amount of "Wide" musical composition effect, but the range is between 51 and 3000 milli-seconds in order to achieve the wide sound effect composition. In accordance with the principles of the present invention the decibels or volume to each the lead and the lag signals is controlled to produce the echo and or doppler effect. In the present examples the lag music is characterize to be transformed with respect to de lead music. For example the lag music comprises a delay, a preferred change in decibel and, in some cases, is restricted to a specific portion or partial composition with respect to the lead music. However, it needs to be understood that the transformation on the source music could be accomplished on the lead music. Therefore, the amount of delay and decibel change could be dynamically altered during the wide sound effect compositions being recorded on the recording medium to have a variety of effects on the wide sound effect composition if desired by the producer. In accordance with the principles of the present disclosure the recorded wide sound effect composition at the recording medium is intended to be readily available to be played the wide sound effect composition comprising a lead music and lag music on any electroacoustic device but not limited to conventional stereo systems, I-pod or MP3 players with headsets, or car stereo systems. Therefore, a wide sound effect is achieved without the need of a expensive stereophonic sound reproduction system with dimensionalized effect capabilities.

According to another aspect, the present disclosure is directed to a method for recording a wide sound effect composition on a recording medium, wherein said method comprises a first composition and a second composition recorded on the same recording medium, wherein the first composition and second composition are delayed with respect to each other, wherein the second composition comprises a lag signal and the first compositions comprises a lead signal and; wherein the second composition and the first compositions are from the same source music. In accordance with the principles of the present invention the lead and lag signals are separated in time by 51-100 milliseconds and the lag signal is attenuated 0-20 percent lower than the lead signal.

According to another aspect, the present disclosure is directed to a method for recording a wide sound effect composition produced by using at least 2 stereo amplifier/receivers with mono output capability and a recording medium, wherein said method for recording a wide sound effect composition comprises a reel to reel tape recorder (tape deck) with input and output stereo capabilities. In accordance with the principles of the present disclosure audio reproducing mechanism comprising a source music including at least two stereo signals transmits to a first analog receiver and a second receiver. The first analog receiver collects through the first receiver input a lead signal and combines the stereo signals to produce a mono signal. The first receiver further transmits a receiver output signal through a first receiver output to a left signal input of the tape deck at the recording device. The second analog receiver collects through the second receiver input a lag signal and combines the stereo signals to produce a mono signal. The second receiver further transmits a second receiver output signal through a second receiver output to a right signal input of the tape deck at the recording device. In the instant case the selection of transmitting a lead signal to the left input of the tape deck or the right input of the tape deck is preselected by the producer and could be changed if preferred but the at least each input of tape deck should receive a lag signal and lead signal respectively. The volume differential from the left and right signals is set while recording by the audio producer for maximum desired effect.

According to another aspect, the present disclosure discloses a recorded medium wide sound effect composition that could be played on any standard two electroacoustic device system. In accordance with the principles of the present disclosure the recorded medium including a wide sound effect composition is completed by a process of isolation, duplication, delay, attenuation or amplification, and delivery to a recording device for future play on any standard two electroacoustic device system. The wide sound effect composition can be dynamic. It can change its delay and amplitude during a composition or from composition to composition.

According to another aspect, the present disclosure is directed to produce and record a lead and lag signals separated in time by 100-200 milliseconds as a single composition. The lag signal is attenuated or amplified 0-20 percent different than the lead signal. In accordance with the principles of the present invention the recorded a lead and lag signals separated in time produces an auditorium echo effect.

According to another aspect, the present disclosure is directed to produce and record a wide sound composition at a recording medium comprising a lag signal which lags 1⁄8th of tempo duration from the lead signal. The lag signal is attenuated or amplified 0-20 percent different than the lead signal. In accordance with the principles of the present invention the composition at a recording medium comprising a lag signal which lags 1⁄8th of tempo duration from the lead signal produces a wobble effect.

According to another aspect, the present disclosure is directed to produce and record a wide sound composition at a recording medium comprising a lag signal which lags 114th of tempo duration from the lead signal. The lag signal is attenuated or amplified 0-20 percent different than the lead signal. In accordance with the principles of the present invention the composition at a recording medium comprising the lag signal which lags 114th of tempo duration from the lead signal produces a back and forth beat effect between the signals conducive to dance.

According to another aspect, the present disclosure is directed to produce and record a wide sound composition at a recording medium comprising a lag signal which lags 1⁄2 or one full tempo duration from the lead signal. The lag signal is attenuated or amplified 0-20 percent different than the lead signal. In accordance with the principles of the present invention the recorded composition comprising lag signal which lags 1⁄2 or one full tempo duration from the lead signal produces a duet effect with the vocals of the music.

The present disclosure may address one or more of the problems and deficiencies of the prior art discussed above. However, it is contemplated that the disclosure may prove useful in addressing other problems and deficiencies in a number of technical areas. Therefore, the claimed invention should not necessarily be construed as limited to addressing any of the particular problems or deficiencies discussed herein.

BRIEF DESCRIPTION OF THE DRAWINGS

The accompanying drawings, which are incorporated herein, constitute part of the specifications and illustrate the preferred embodiment of the disclosure.

FIGS. 2a-2b show exemplary views of the wide delay effect in accordance with the principle of the present disclosure;

DETAILED DESCRIPTION

The term audio reproducing mechanism or a signal producing device are used to generally refer to hardware or software that read, plays, and records audio files encoded and other audio formats. The audio reproducing mechanism may include sound generating system or electroacoustic devices (i.e. speakers), semiconductor, magnetic disk, or optical disk (such as CD-ROM, DVD-ROM) or any other form to read storage information in a recording medium. Further communication between the audio reproducing mechanism and electroacoustic device comprises any communication medium to transfer the read recorded information in any storage unit or a hard disk drive to the electroacoustic medium such as wired or wireless connections.

In the present disclosure, the terms "recording medium" refers to any device capable of storing recoverable digital or non-digital information. Commonly the recording medium is distributed for use by individuals, that is primarily marketed or most commonly used by consumers for the purpose of making audio copied recordings by use of an audio recording device, The present disclosure relates to a method for producing a sound particularly adapted to create a wide effect sound and an apparatus comprising said wide effect recorded media. In accordance to the present disclosure the wide sound effect composition is achieved by different method. The present disclosure includes at least three exemplary embodiments for recording a wide sound composition on a recording medium. Each exemplary embodiment comprises a source of audible media, mainly describe as source music, which is provided to at least an audio reproducing mechanism PD. The source of audible media or source music comprises audio information preferably in the form of a signal SA, SB to be recognize by the audio reproducing mechanism, wherein said source music comprises a composition, voice or any other type of audible media. The source of audible media format may vary; however the audio reproducing mechanism PD is intended to read and transfer the source of audible media through a communication medium OA, OB to a recording medium RD. A delay D is generated between signals before it is recorded by the recording medium RD.

Figure 1:
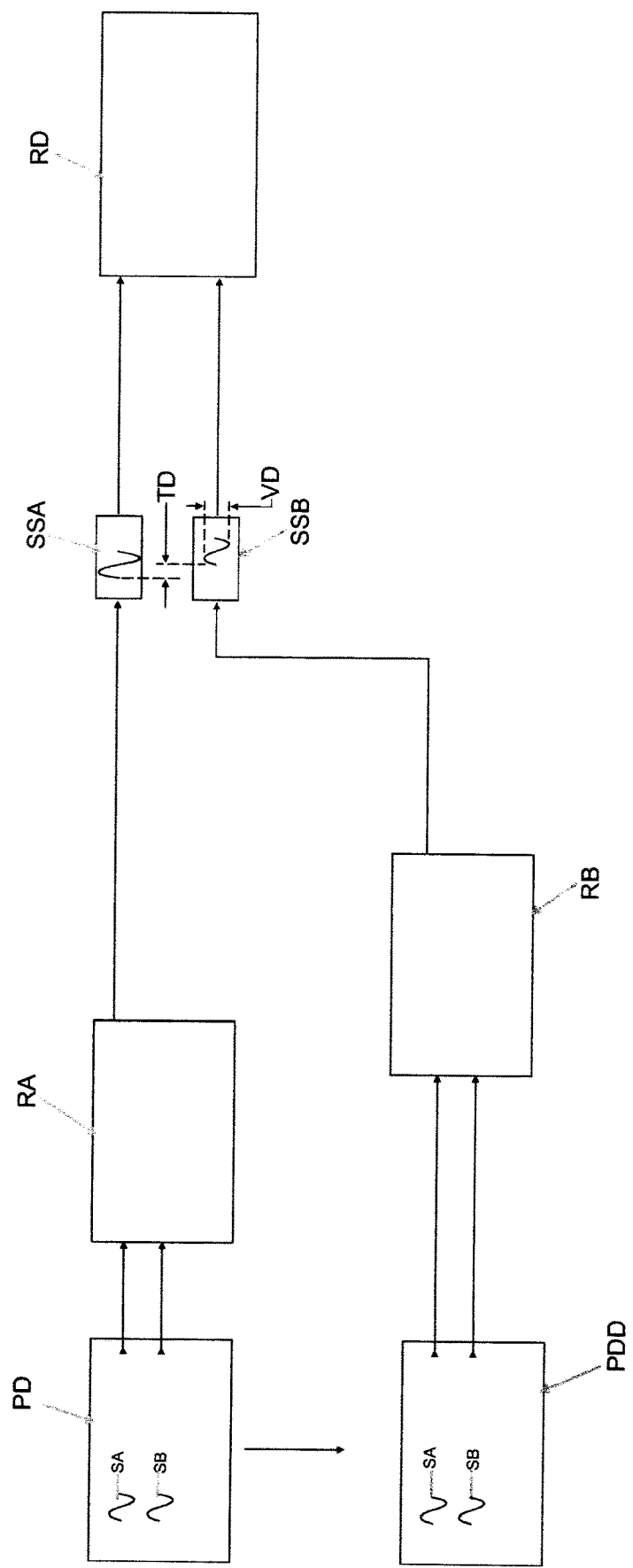
FIG. 1 shows a first exemplary embodiment including at least an audio reproducing mechanism transmitting recognizable audio signal through a communication medium and a recording medium receiving recognizable audio signal and recording suggested combinations of lead and lag signal of said recognizable audio signal in accordance with the principle of the present disclosure.

The first exemplary embodiment is shown in FIG. 1, wherein an audio reproducing mechanism PD including a source music with recognizable audio signals SA, SB transmits through a communication medium to a recording device RD including a recording medium. In the instant case the recording device RD receives recognizable audio signal SA, SB and records a suggested combinations of lead and lag signal in accordance with the principle of the present disclosure.

As shown, the source music, such as a pre-recorded musical full or partial composition, is duplicate into first audible source A and the audible source B. Audible source A and audible source B are the same base composition but parts (tracks) of the composition may be excluded (meaning partial composition) as it may negatively affect the final composite recording. An audio recording device RD is set up to accept left and right stereo inputs. The audio recording device RD is preferred to start recording before the audio reproducing mechanism transfer the signals. The audible source A is played as a full composition or partial composition by the first audio reproducing mechanism PD. The left and right signal SA, SB of the audible source A are combined into a "Mono" signal by a first analog receiver RA and sent to a recoding device's left signal recording input on said audio recording device RD. Next, the audible source B is read and played by a second audio reproducing mechanism PDD as a full composition or partial composition with a preferred delay D, for example a 51-3000 millisecond delay D from audible source A. The audible source B decibels or volume may be changed in respect to source music "A". Other audible source elements may be edited or altered such as treble and/or base. The left and right signal SA, SB of the source music "B" are combined into a "Mono" signal by a second analog receiver RB and sent to a recoding device's right signal recording input on the audio recording device RD. The audio recording device RD stops recoding at the end of both audible source A and the source music "B" is played. The audio recording device RD records the audible source A and the audible source B to produce a recorded final composition or wide sound effect composition. In the instant case a reel to reel recording device is used. Therefore, the first analog receiver RA transmits a receiver output signal through a first receiver output to a left signal input of the tape desk at the recording device RD. The second analog receiver RB collects through the second receiver input a lag signal SSB and combines the stereo signals SA, SB to produce a mono signal. The second analog receiver RB further transmits a second receiver output signal through a second receiver output to a right signal input of the tape desk at the recording device RD. As mentioned before, the selection of transmitting a lead signal SSA to the left input of the tape desk or the right input of the tape desk is preselected by the producer and could change if preferred but at least each input of tape desk should receive a lag signal SSB and lead signal SSA respectively.

The recorded final composition including a wide sound composition is then ready for independent play on any standard stereo equipment. Further, it is important to understand that the audible sources can be reversed meaning that the audible source A could be recorded through the right signal and the audible source B could be recorded through the left signal in the process above.

FIGS. 2a-2b show an exemplary views of the wide delay D effect changed by the producer to gain the maximum desired effect adjustable to the composition. The horizontal axis represents the length of the composition time CT. The vertical axis represents the amount of delay D between the right (lead) SSA and the left (lag) SSB signals. The amount of wide effect changes from verse V to chorus C. FIG. 2a represents an abrupt change and FIG. 2b represents a ramped change with several levels of wide represented.

Figure 3:
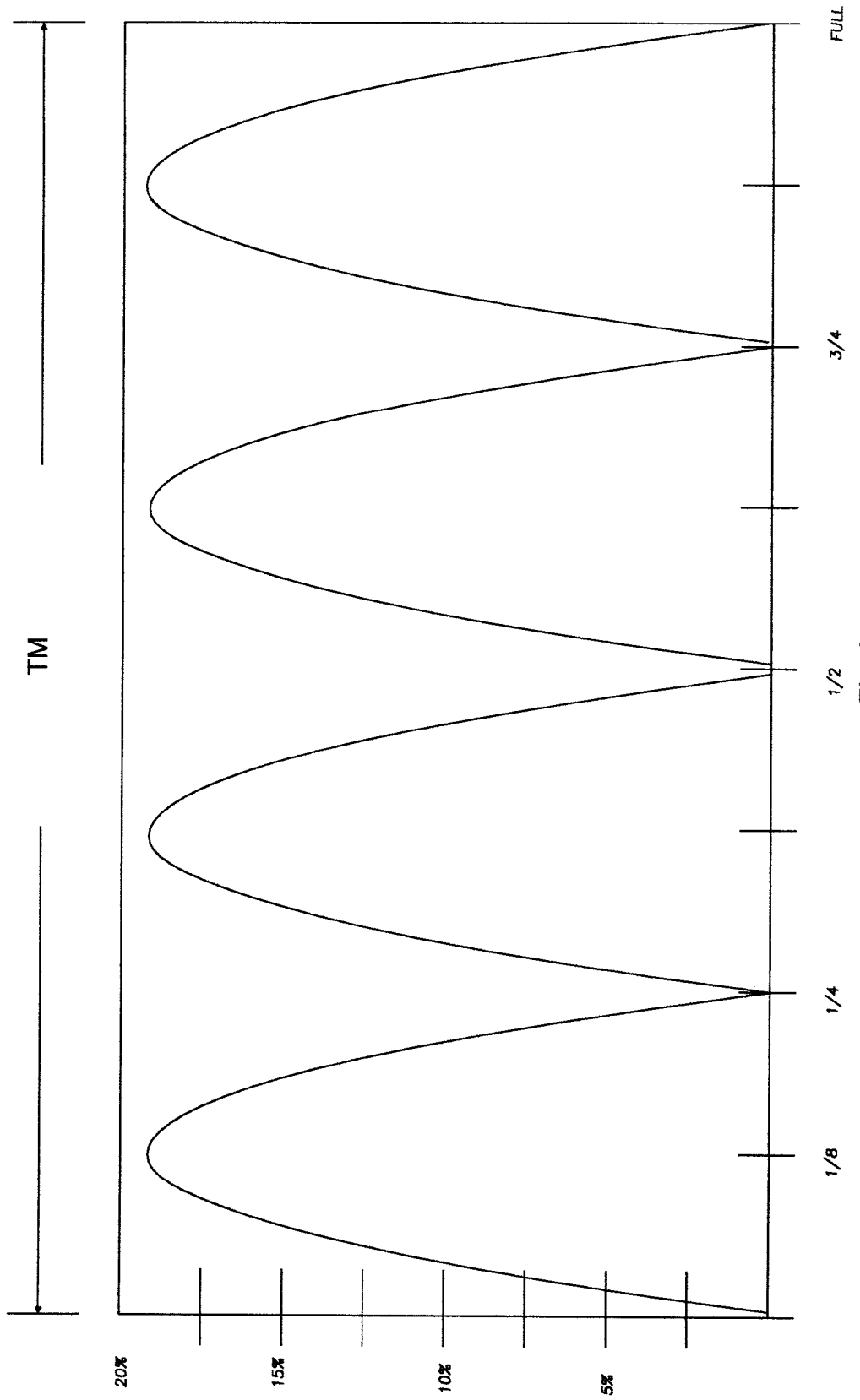
FIG. 3 shows another exemplary view of the wide delay effect in accordance with the principle of the present disclosure.

Further FIG. 3 shows a wide delay effect time and the relation between the delay D and volume differential between signal A SA and signal B SB. The delay D on the horizontal axis is shown in terms of Tempo TM and the decibels or volume on the vertical axis is shown in term of percent. The horizontal axis, as disclosed, shows an exemplary amount of delay between the lead SSA and lag signal SSB in reference to a full measure (tempo). The exemplary volumetric differential between the lead SSA and the lag signal SSB has a 20% top, however the percentage could be higher and not limited to 20%. The exemplary volumetric differential assumes zero on ¼ measure delay D increments for best effect results.

Figure 4:
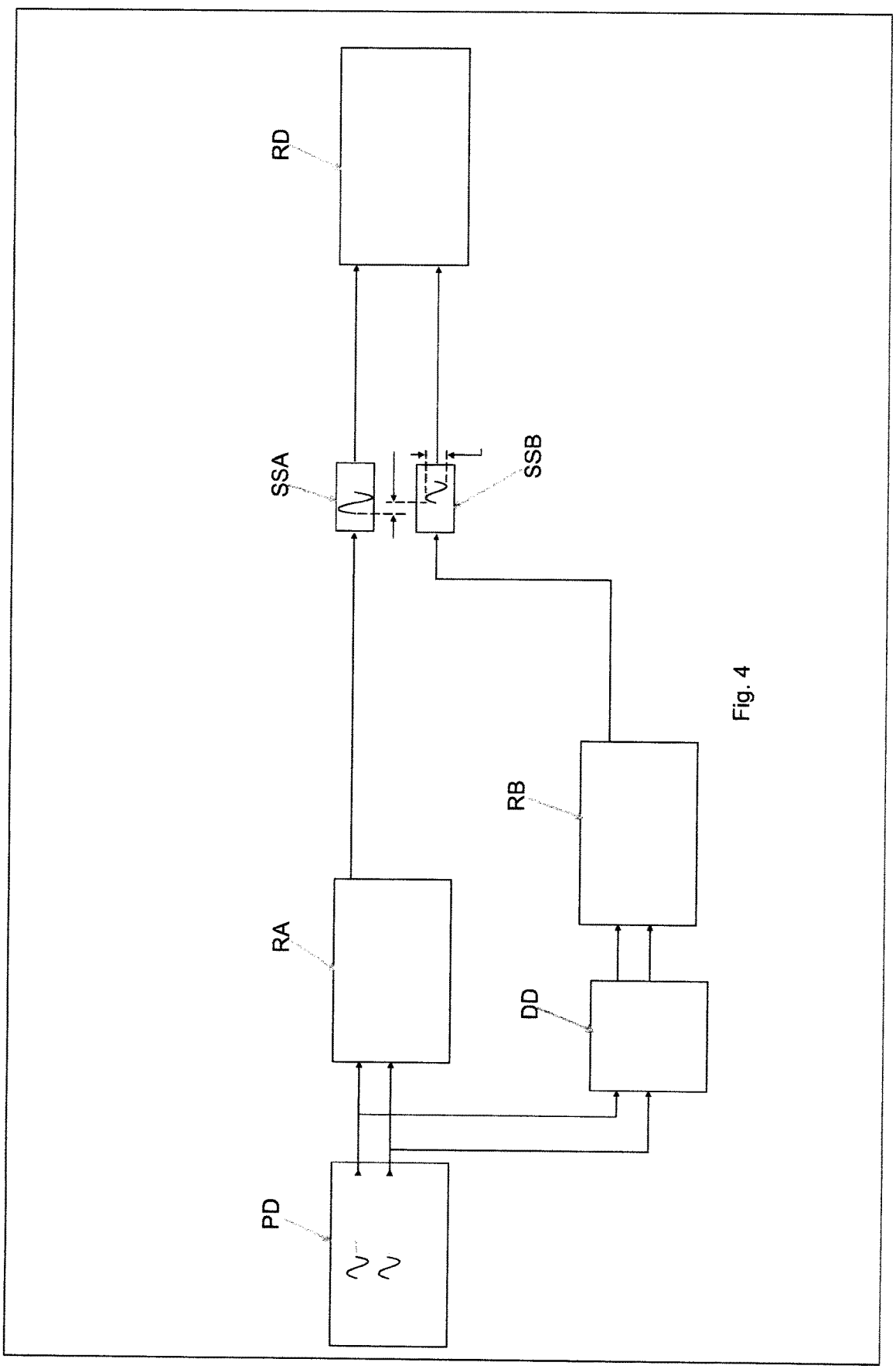
FIG. 4 shows a second exemplary embodiment including at least an audio reproducing mechanism transmitting recognizable audio signal through a communication medium and a recording medium receiving recognizable audio signal and recording suggested combinations of lead and lag signal of said recognizable audio signal in accordance with the principle of the present disclosure.

Another secondary embodiment, as shown in FIG. 4, an audio reproducing mechanism PD transmits recognizable audio signals SA, SB through a communication medium toward a recording device RD including a recording medium RM which receives said recognizable audio signal and records a combinations of lead SSA and lag signal SSB in accordance with the principle of the present disclosure. As shown, the source of audible media A, such as a pre-recorded musical composition, is produce by at least one audio reproducing mechanism PD and parallel transmitted to a first analog receiver RA and a delay device DD. The signal transmitted to the delay device DD is then forwarded to second analog receiver RB.

Therefore, the left and right signal SA, SB of the audible source A are combined into a "Mono" signal by a first analog receiver RA and sent to a recoding device's left signal recording input on said audio recording device RD and simultaneously said audible source A is parallel transmitted the delay device DD as a full composition or partial composition wherein a desired delay D is applied to the audible source A. The delayed left and right signal SA, SB of the source music "A" with are combined into a "Mono" signal by a second analog receiver RB and sent to a recoding device's input right signal for recording the lag signal SSB on the audio recording device RD. Then the audio recording device RD records the audible source A and the audible source A with delay D to produce a recorded final composition or wide sound effect composition.

Figure 5:
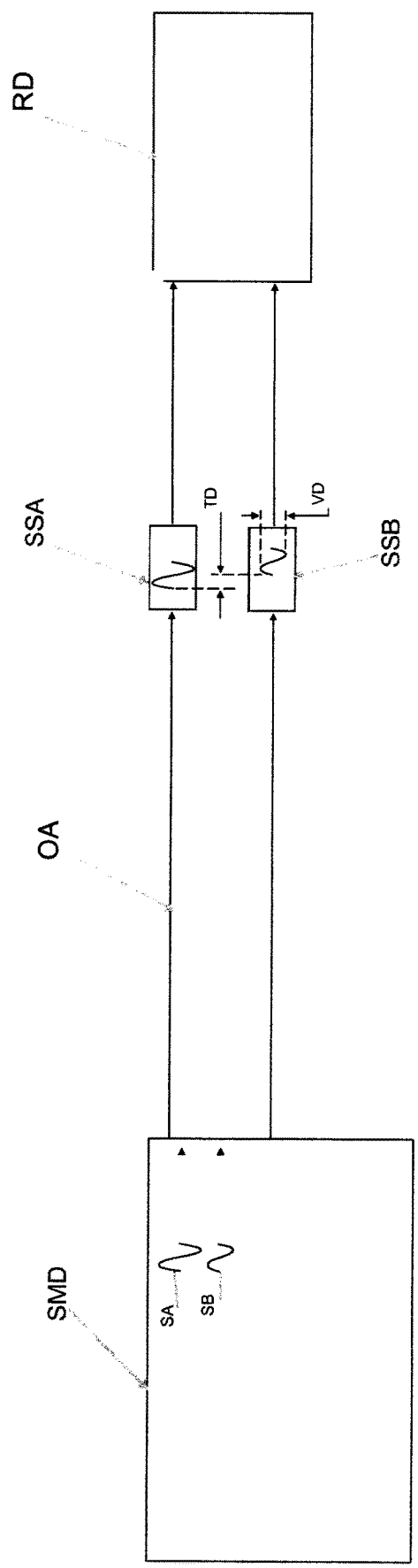
FIG. 5 shows a third exemplary embodiment of a sound mixing device producing a suggested combination of lead and lag signal through a communication medium and a recording medium receiving a recognizable audio signal including the combination of lead and lag signal of said recognizable audio signal in accordance with the principle of the present disclosure.

The third embodiment, as shown in FIG. 5, comprises a sound mixing device SMD which transmits recognizable audio signals SA, SB through a communication medium toward a recording device RD including a recording medium RM which receives said recognizable audio signal and records a combinations of lead SSA and lag signal SSB in accordance with the principle of the present disclosure. As shown, the source of audible media A, such as a pre-recorded musical composition, is performed by a sound mixing device SMD which comprises a source music including a signal A SA and a signal B SB. The source music signals are divided and transfer to a recording device by at least two different paths. The first path carrying the signal A SA and the second path carrying the signal B SB, wherein said signal B SB comprises is altered by the sound mixing device SMD. The signal B SB comprises a delay D and volume adjustment VD as desired by producer. The recording device RD receives said signal from the different inputs and records the produced the wide sound composition.

Figure 6:
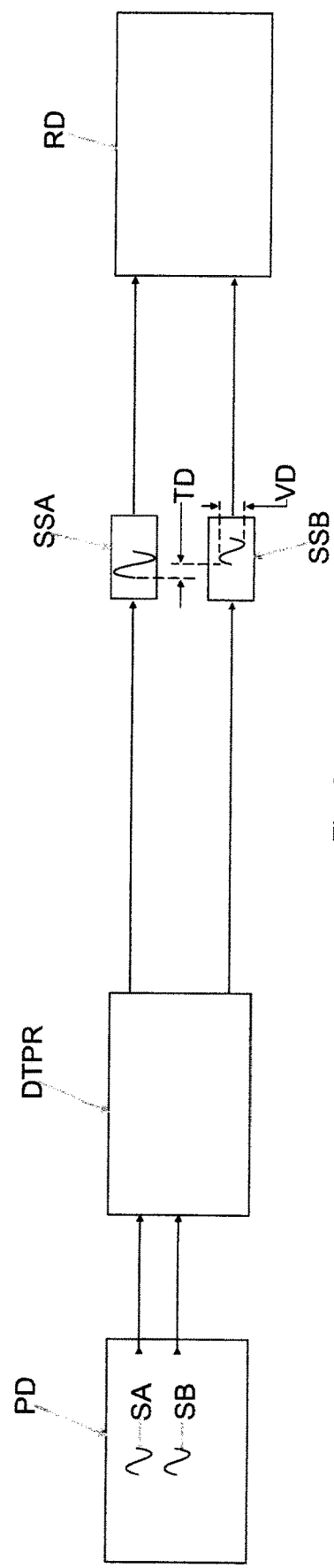
FIG. 6 shows an exemplary embodiment of a signal producing device transmitting recognizable audio signal through a communication medium and a recording medium receiving recognizable audio signal and recording suggested combinations of lead and lag signal of said recognizable audio signal using a computer program in accordance with the principle of the present disclosure.

Further, those with skill in the computing arts will recognize that the disclosed embodiments have relevance to a wide variety of applications and architectures in addition to those described above. For example, as shown in FIG. 6 a computer or computer program may duplicate signal, provide a delay and create a mono signal. For example an audio reproducing mechanism PD transmits recognizable audio signals SA, SB through a communication medium toward a computer or computer program DTPR which comprises a series of instructions to acquire the recognizable audio signals SA, SB, duplicate the recognizable audio signals SA, SB, altered the recognizable audio signals, creating a delay, generating at least two mono signals from said recognizable audio signals and transmitting a lead signal SSA toward a first input of a recording device RD and a lag signal SSB toward a second input of the recording device RD. As mentioned before, the recording device RD includes a recording medium RM which receives said recognizable audio signal and records a combinations of lead SSA and lag signal SSB in accordance with the principle of the present disclosure.

Therefore, in addition, the functionality of the subject matter of the present application can be implemented in software, hardware, or a combination of software and hardware to provide the processing functions. The hardware portion can be implemented using specialized equipment as explained above; and in case it is need it the software portion can be stored in a memory and executed by a suitable instruction execution system as explained above.

Figure 7:
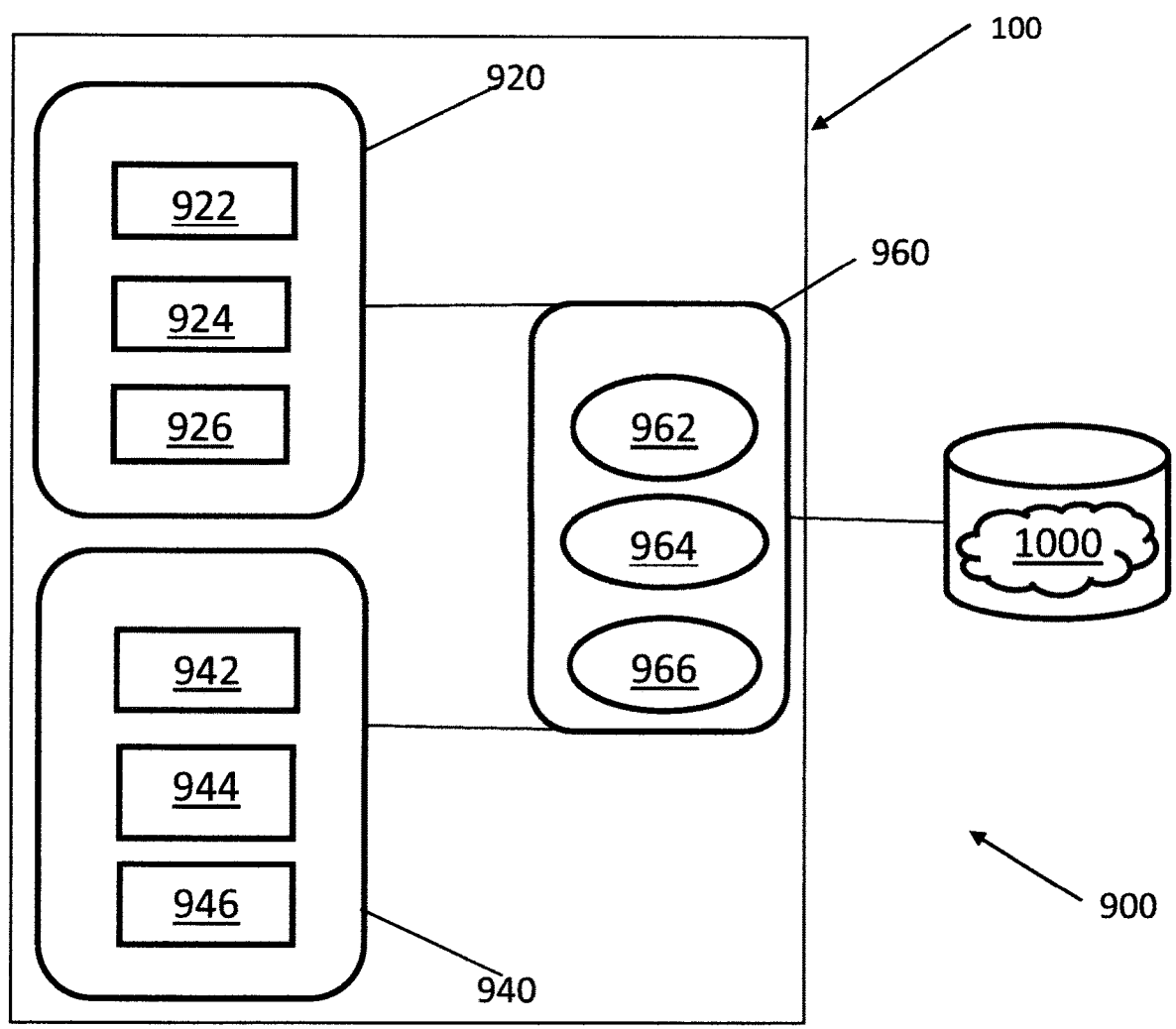
FIG. 7 shows exemplary embodiment of a recording medium receiving recognizable audio signal through a communication medium including a software platform to complete the recording suggested combinations of lead and lag signal of said recognizable audio signal accordance with the principle of the present disclosure.

The computer used on the exemplary embodiment comprising a computer or a program may include a computer 100 including a microprocessor, as shown in FIG. 7. Components of the computer 100 may include, but are not limited to, central processing system 960 comprising at least a microprocessor unit 962, and operating system 964 and a 1/0 management system. The computer 100 may include several inputs 920 including a variety of portals 922, 924, 926 and outputs 940 including a variety of portals 942, 944, 946 coupled to the central processing system. Further a data base 1000 including a system memory, and at least a system bus that couples various system components including the system memory to the processing unit. The system bus may be any of several types of bus structures including, but not limited to, a memory bus or memory controller, a peripheral bus, and/or a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The computer 100 typically includes a variety of computer readable media. Computer readable media can be any available media that can be accessed by the computer 100 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory includes computer storage media in the form of volatile and/or nonvolatile memory such as read only memory (ROM) and random access memory (RAM). A basic input/output system (BIOS), containing the basic routines that help to transfer information between elements within computer 100, such as during start-up, is typically stored in ROM. RAM typically contains data and/or program modules that are immediately accessible to and/or presently being operated on by processing unit. By way of example, and not limitation, FIG. 7 illustrates operating system 100, central processing system 960, and database.

The computer 100 and central processing system 960 may also include other removable/non-removable, volatile/nonvolatile computer storage media. The computer 100 and central processing system 960 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, or the like. The hard disk drive is typically connected to the system bus through a non-removable memory interface such as interface, and magnetic disk drive and optical disk drive are typically connected to the system bus by a removable memory interface, such as interface.

The drives and their associated computer storage media, discussed above, provide storage of computer readable instructions, data structures, program modules and other data for the computer 100. A user may enter commands and information into the computer 100 through input devices such as a tablet or electronic digitizer, a microphone, a keyboard and pointing device, commonly referred to as a mouse, trackball or touch pad. Other input devices (not shown) may include a joystick, game pad, satellite dish, scanner, or the like. These and other input devices are often connected to the processing unit through a user input interface that is coupled to the system bus, but may be connected by other interface and bus structures, such as a parallel port, game port or a universal serial bus (USB). A monitor or other type of display device is also connected to the system bus via an interface, such as a video interface. The monitor may also be integrated with a touch-screen panel or the like. Note that the monitor and/or touch screen panel can be physically coupled to a housing in which the computing device 100 is incorporated, such as in a tablet-type personal computer. In addition, computers such as the computing device 100 may also include other peripheral output devices such as speakers and printer, which may be connected through an output peripheral interface or the like. A display device, for purposes of this patent application can include an e-paper display, a liquid crystal display or the like.

The computer 100 may operate in a networked environment using logical connections to one or more remote computers, such as a remote computer. The remote computer may be a personal computer, a server, a router, a network PC, a peer device or other common network node, and typically includes many or all of the elements described above relative to the computer. The logical connections depicted in FIG. 7 include a local area network (LAN) and a wide area network (WAN), but may also include other networks. Such networking environments are commonplace in offices, enterprise-wide computer networks, intranets and the Internet. For example, in the subject matter of the present application, the computer system 100 may comprise the source machine from which data is being migrated, and the remote computer may comprise the destination machine. Note however that source and destination machines need not be connected by a network or any other means, but instead, data may be migrated via any media capable of being written by the source platform and read by the destination platform or platforms. When used in a LAN or WLAN networking environment, the computer 100 is connected to the LAN through a network interface or adapter. When used in a WAN networking environment, the computer 100 typically includes a modem or other means for establishing communications over the WAN, such as the Internet. The modem, which may be internal or external, may be connected to the system bus via the user input interface or other appropriate mechanism. In a networked environment, program modules depicted relative to the computer 100, or portions thereof, may be stored in the remote memory storage device. By way of example, remote application programs may reside on memory device. It will be appreciated that the network connections disclosed are exemplary and other means of establishing a communications link between the computers may be used.

It will be apparent to those skilled in the art that various modifications and variations can be made to the method and system described in the present disclosure. Other embodiments of the method and system will be apparent to those skilled in the art upon consideration of the specification and practice of the method and system disclosed herein. It is intended that the specification and examples be considered as exemplary only, with a true scope of the disclosure being indicated by the claims.

The invention claimed is:

1. An apparatus comprising a non-transitory recording medium, wherein said non-transitory recoding medium includes a wide sound composition, wherein said wide sound composition comprises a recorded source music and, wherein said wide sound composition comprises a lag signal and a lead signal,
   wherein said lag signal comprises a lag source music,
   wherein said lead signal comprises a lead source music,
   wherein said lag signal comprises a delayed lead signal and,
   wherein said lag signal is time delayed from said lead signal by a time delay period with a range between 51 and 3000 Milli-seconds.

2. The apparatus as in claim 1, wherein said lag signal comprises a first amount of decibels and said lead signal comprises a second amount of decibel, wherein the first amount of decibels is different from the second amount of decibels.

3. The apparatus as in claim 1, wherein said lead signal is a first analog signal and wherein said lag signal comprises a delayed lead signal.

4. A wide sound composition comprising a recorded source music, wherein said recorded source music comprises a lag signal from a source music and a lead signal from the source music and; wherein said recorded source music is recorded on an non-transitory audio recording medium wherein said lag signal comprises a delayed lead signal and, wherein said lag signal is time delayed from said lead signal by a time delay period with a range between 51 and 3000 Milli-seconds.

5. The sound composition as in claim 4, wherein said lag signal comprises a first amount of decibels and said lead signal comprises a second amount of decibel, wherein the first amount of decibels is different from the second amount of decibels.

6. The sound composition as in claim 4, wherein said lead signal is a first analog signal and wherein said lag signal comprises a delayed lead signal.

7. A method for producing an audio recording in a recoding medium including a wide sound composition comprising an audio reproducing mechanism, an audio recording device, an non-transitory audio recording medium and a source music, wherein said reproducing mechanism generates a lag signal and a lead signal from said source music and wherein said recording device records said lag signal and lead signal on the non-transitory audio recording medium, wherein said lag signal comprises a lag music,
wherein said lead signal comprises a lead music,
wherein said lag signal comprises a delayed lead signal and,
wherein said lag signal is time delayed from said lead signal by a time delay period with a range between 51 and 3000 Milli-seconds.

8. The method as in claim 7, wherein said lag signal comprises a first amount of decibels and said lead signal comprises a second amount of decibel, wherein the first amount of decibels is different from the second amount of decibels.

9. The method as in claim 7, wherein said lead signal is a first analog signal and wherein said lag signal comprises a delayed lead signal.

10. A method for recording an audio recording in a non-transitory recording medium including a wide sound composition from a source music comprising;

a recording device and the non-transitory recording medium,
wherein said recording device comprises a left signal input receiving a lead signal and a right signal input receiving a lag signal, wherein said recording medium comprises a recording left signal portion and a recording right signal portion, wherein said recording device records the lead signal on the recording left signal portion, wherein said recording device records the lag signal input on the recording right signal portion and; wherein said wherein said lag signal comprises a delayed lead signal,
wherein said lag signal comprises a lag music,
wherein said lead signal comprises a lead music,
wherein said lag signal is time delayed from said lead signal by a time delay period with a range between 51 and 3000 Milli-seconds and
wherein said lag signal comprises a first amount of decibels and said lead signal comprises a second amount of decibel, wherein the first amount of decibels is different from the second amount of decibels.

11. The method as in claim 10, wherein said lead signal is a first analog signal and wherein said lag signal comprises a delayed lead signal.

* * * * *